(12) United States Patent
Sun

(10) Patent No.: US 7,380,147 B1
(45) Date of Patent: May 27, 2008

(54) COMPUTER DEVICE EMPLOYING A SLIDING WINDOW TO SET AN IDLE MODE TIMEOUT INTERVAL

(75) Inventor: Ye Sun, Tustin, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 372 days.

(21) Appl. No.: 11/256,724

(22) Filed: Oct. 24, 2005

(51) Int. Cl.
*G06F 1/00* (2006.01)
*G06F 3/00* (2006.01)

(52) U.S. Cl. .......................... 713/323; 710/58; 710/14; 710/19

(58) Field of Classification Search ........ 713/300–340; 710/8, 48, 15–19, 58–61; 360/51–52, 75, 360/77.08, 78.01
See application file for complete search history.

(56) References Cited

U.S. PATENT DOCUMENTS

| | | | |
|---|---|---|---|
| 4,654,821 A * | 3/1987 | Lapp ......................... | 713/330 |
| 5,452,277 A | 9/1995 | Bajorek et al. | |
| 5,481,733 A | 1/1996 | Douglis et al. | |
| 5,493,670 A | 2/1996 | Douglis et al. | |
| 5,504,907 A | 4/1996 | Stewart et al. | |
| 5,517,649 A | 5/1996 | McLean | |
| 5,544,138 A | 8/1996 | Bajorek et al. | |
| 5,682,273 A | 10/1997 | Hetzler | |
| 5,774,292 A | 6/1998 | Georgiou et al. | |
| 5,787,292 A | 7/1998 | Ottesen et al. | |
| 5,954,820 A | 9/1999 | Hetzler | |
| 6,097,679 A | 8/2000 | Ohtaki | |
| 6,128,717 A | 10/2000 | Harrison et al. | |
| 6,400,892 B1 | 6/2002 | Smith | |
| 6,516,421 B1 | 2/2003 | Peters | |
| 6,553,501 B1 | 4/2003 | Yokoe | |
| 6,608,729 B1 | 8/2003 | Willems et al. | |
| 6,721,906 B1 | 4/2004 | Hirashita et al. | |
| 6,885,974 B2 * | 4/2005 | Holle ......................... | 702/182 |
| 6,892,313 B1 | 5/2005 | Codilian et al. | |
| 2003/0061263 A1 * | 3/2003 | Riddle ......................... | 709/104 |
| 2004/0110499 A1 * | 6/2004 | Kang et al. ............... | 455/422.1 |
| 2005/0044436 A1 * | 2/2005 | Holle ......................... | 713/320 |
| 2005/0125702 A1 | 6/2005 | Huang et al. | |
| 2005/0177841 A1 * | 8/2005 | Ichikawa ..................... | 720/659 |

FOREIGN PATENT DOCUMENTS

WO          WO 01/15161 A1          3/2001

OTHER PUBLICATIONS

U.S. Appl. No. 10/105,493, Codilian et al.

* cited by examiner

*Primary Examiner*—Christopher Shin
(74) *Attorney, Agent, or Firm*—Howard H. Sheerin, Esq.

(57) ABSTRACT

A computer device is disclosed comprising at least one component operable to process commands at command intervals, and control circuitry operable to set an idle mode timeout interval. The control circuitry stores a plurality of the command intervals, and then evaluates the command intervals to set the timeout interval by finding a qualifying number of the command intervals that fall within a sliding window. The component is configured into an idle mode if a most recent command interval exceeds the timeout interval. In this manner, after entering the idle mode the probability that the next command will be processed within the sliding window is reduced, thereby helping to optimize power consumption.

25 Claims, 7 Drawing Sheets

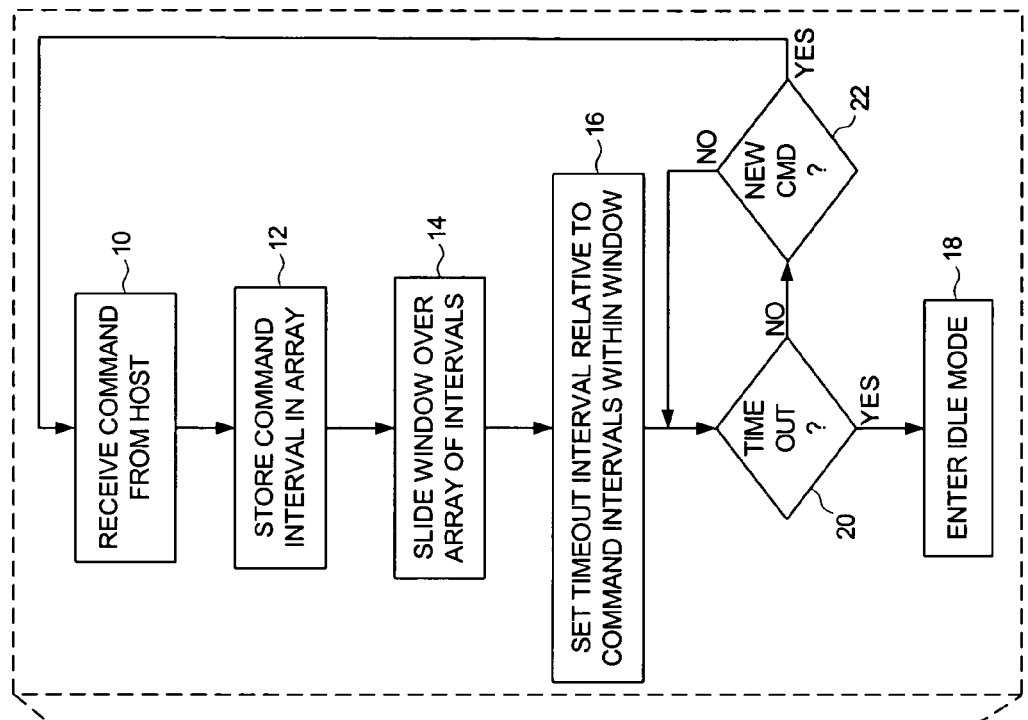
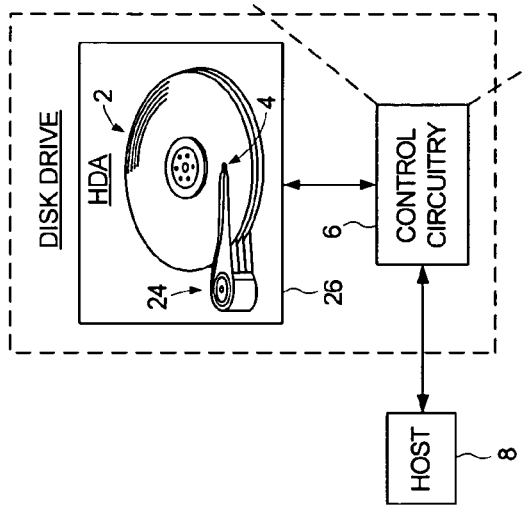
FIG. 1A
FIG. 1B

COMPUTER DEVICE EMPLOYING A SLIDING WINDOW TO SET AN IDLE MODE TIMEOUT INTERVAL

BACKGROUND OF THE INVENTION

1. Field of the Invention

The present invention relates to computer devices, such as disk drives. More particularly, the present invention relates to a computer device employing a sliding window to set an idle mode timeout interval.

2. Description of the Prior Art

Mobile computer devices, such as laptop computers, typically incorporate a disk drive comprising a head disk assembly (HDA) and control circuitry. Since minimizing power consumption is of particular concern in mobile devices, a power management algorithm is typically implemented wherein the disk drive enters an idle mode if a host command is not received within a predetermined timeout interval. It is important to set the timeout interval to an appropriate value since there is a certain amount of recovery time and energy dissipated to exit the idle mode when a command is received. That is, if the timeout interval is too short, the disk drive may consume more power and lose performance due to the latency in repeatedly entering/exiting the idle mode as opposed to remaining in an active mode.

Prior art disk drives have employed a fixed timeout interval for entering the idle mode; however, a fixed timeout interval may not result in optimal performance depending on the operating environment of the disk drive. For example, if the disk drive is receiving intermittent host commands over long command intervals, a more optimal power/performance level may be achieved by reducing the timeout interval so that the disk drive enters the idle mode soon after processing each host command.

There is, therefore, a need to optimize an idle mode timeout interval in a computer device, such as a disk drive, to account for variations in the operating environment.

SUMMARY OF THE INVENTION

An embodiment of the present invention comprises a computer device including at least one component for processing commands at command intervals. The computer device further comprises control circuitry for storing a plurality of the command intervals, and evaluating the plurality of command intervals to set a timeout interval by finding a qualifying number of the command intervals that fall within a sliding window. The component is configured into an idle mode if a most recent command interval exceeds the timeout interval.

In one embodiment, the qualifying number is a minimum number of the command intervals that fall within the sliding window, and in an alternative embodiment, the qualifying number is a predetermined percentage of the command intervals that fall within the sliding window.

In one embodiment, the computer device receives the commands from a host, and in one embodiment, the computer device comprises a disk drive.

In another embodiment, the most recent command interval is measured from reception by the computer device of a most recent command. In an alternative embodiment, the most recent command interval is measured from a response sent by the computer device relating to a most recent command.

In yet another embodiment, the control circuitry slides the sliding window from a minimum value to a maximum value.

In still another embodiment, a width of the sliding window is substantially equal to a break even interval corresponding to a minimum amount of time the computer device must remain in the idle mode in order to reduce power consumption.

In one embodiment, the control circuitry sets the timeout interval relative to a beginning of the sliding window.

In another embodiment, the computer device is configured to enter a plurality of idle modes, and the control circuitry adjusts a width of the sliding window relative to a current idle mode. In another embodiment, the control circuitry adjusts at least one of the minimum value and the maximum value relative to a current idle mode.

In yet another embodiment, the control circuitry adjusts a width of the sliding window in response to a host command. In another embodiment, the control circuitry adjusts at least one of the minimum value and the maximum value in response to a host command.

In still another embodiment, the control circuitry stores the command intervals in a histogram comprising a plurality of buckets, wherein a width of each bucket equals a quantized step in the range of command intervals, and each bucket stores a value representing the number of commands having a corresponding command interval. In one embodiment, a width of the sliding window equals the width of one of the buckets, and the control circuitry sets the timeout interval by finding the minimum bucket value. In an alternative embodiment, the width of the sliding window equals the width of a plurality of buckets. The control circuitry calculates a combined bucket value for each combination of the plurality of buckets corresponding to the sliding window, and sets the timeout interval by finding the minimum of the plurality of combined bucket values.

Another embodiment of the present invention comprises a method of setting a timeout interval for a computer device comprising at least one component operable to process commands at command intervals. The method comprises the steps of storing a plurality of the command intervals, evaluating the plurality of command intervals to set a timeout interval by finding a qualifying number of the command intervals that fall within a sliding window, and configuring the component into an idle mode if a most recent command interval exceeds the timeout interval.

BRIEF DESCRIPTION OF THE DRAWINGS

FIG. 1A shows a computer device (a disk drive) according to an embodiment of the present invention comprising control circuitry for setting an idle mode timeout interval.

FIG. 1B is a flow diagram executed by the control circuitry for sliding a window over a plurality of command intervals and setting the timeout interval by finding a qualifying number of command intervals that fall within the sliding window according to an embodiment of the present invention.

DESCRIPTION OF THE PREFERRED EMBODIMENTS

Figure 2A:
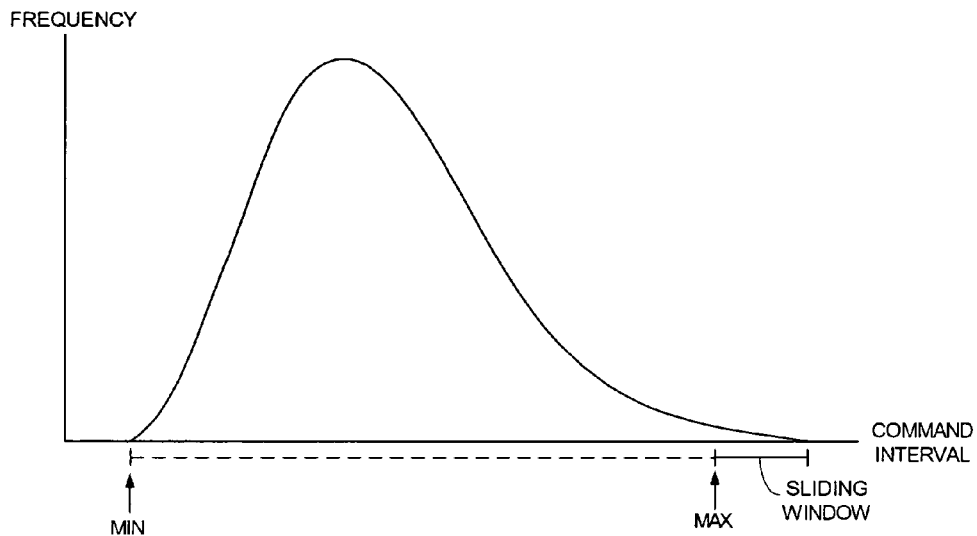
FIG. 2A shows a command interval distribution wherein the device is servicing commands at a higher frequency such that the timeout interval is set to the maximum.

FIG. 1A shows a computer device (e.g., a disk drive) according to an embodiment of the present invention comprising a disk 2, a head 4 actuated over the disk 2, and control circuitry 6 operable to set a timeout interval for the disk drive by executing the flow diagram of FIG. 1B. As commands are received from a host 8 at step 10, a plurality of corresponding command intervals are stored at step 12. At step 14 a sliding window is moved across the stored command intervals, and at step 16 the timeout interval is set by finding a qualifying number of the command intervals that fall within the sliding window. At step 18 the disk drive enters an idle mode if at step 20 a most recent command interval exceeds the timeout interval. Otherwise, if a new command is received at step 22 within the timeout interval, the flow diagram is re-executed starting at step 10.

Any suitable control circuitry 6 may be employed to implement the embodiments of the present invention. In one embodiment, the control circuitry 6 comprises a microprocessor executing instructions, the instructions being operable to cause the microprocessor to perform the steps of FIG. 1B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 6 comprises suitable logic circuitry, such as state machine circuitry.

As would be well understood by those of skill in the art, embodiments of the present invention may be implemented in any suitable computer device, such as information storage devices, including magneto-optical disk drives, optical disk drives (CD-ROMs, DVD-ROMs, etc.), tape drives, flash memory, etc. These information storage devices may reduce the power to their internal components as would be well understood by one of skill in the art in order to enter different idle modes.

In the embodiment of FIG. 1A, the head 4 is attached to the distal end of an actuator arm, which is rotated about a pivot by a voice coil motor (VCM) 24 in order to position the head 4 radially over the disk 2. A spindle motor (not shown) rotates the disk 2, creating an air bearing between the disk surface and head 4 so that the head 4 is said to "fly" just above the disk surface. The spindle motor, VCM 24, disk 2, and head 4 are enclosed in a head disk assembly (HDA) 26, wherein the control circuitry 6 is mounted on a printed circuit board coupled to the HDA 26.

In one embodiment, the control circuitry for implementing the power management algorithm resides within a computer device (e.g., an information storage device) that receives commands from a host. In one embodiment, the computer device implements the power management algorithm independent of the host. In an alternative embodiment, the computer device receives a command from the host to alter the power management algorithm, for example, to achieve a desired power vs. performance level. In yet another embodiment, the control circuitry for implementing the power management algorithm resides within a host, wherein the host sends a command to a component (such as an attached disk drive) to enter an idle mode.

Any suitable component or number of components for processing the commands may be configured into an idle mode. In one embodiment, the computer device comprises a portable computer including a disk drive for processing commands, wherein a microprocessor within the portable computer implements the power management algorithm. For example, the microprocessor may execute an operating system comprising a device driver for interfacing with the disk drive. The device driver may track the command intervals as commands are sent to the disk drive, and evaluate the command intervals to set the timeout interval. If the most recent command interval exceeds the timeout interval, the device driver sends a command to the disk drive to enter the idle mode. In yet another embedment, the microprocessor may track the command intervals associated with an end user (e.g., an end user typing on a keyboard). If the command interval exceeds the timeout interval, the microprocessor may configure any suitable component into an idle mode, such as a disk drive or video screen.

Figure 4:
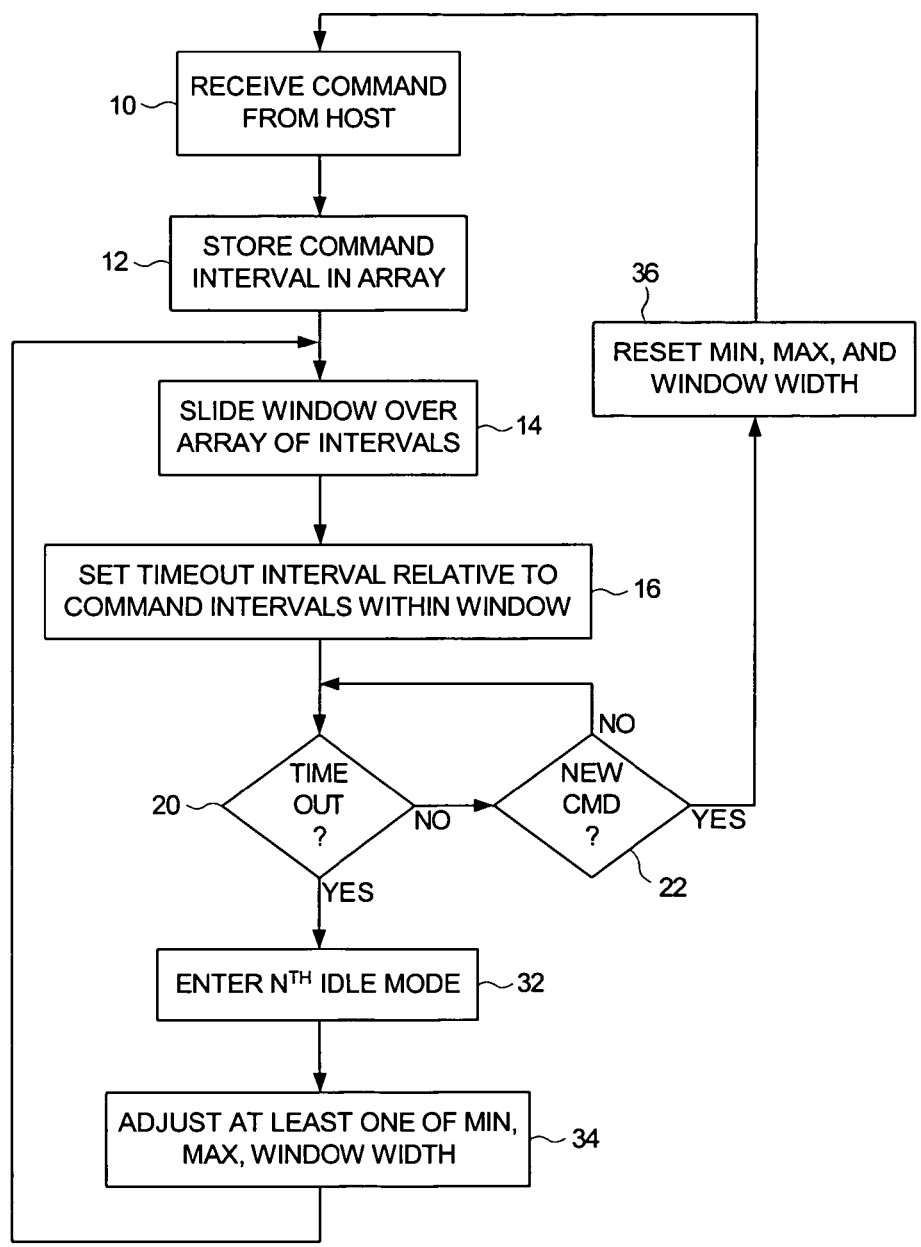
FIG. 4 is a flow diagram according to an embodiment of the present invention wherein at least one of the window width, minimum and maximum sliding window values is adjusted relative to a current idle mode.

In the embodiment wherein the computer device is a disk drive, as in the embodiment of FIG. 1A, the control circuitry 6 within the disk drive implements the power management algorithm and configures the components for processing the commands (such as the VCM 24 or the spindle motor) into an idle mode. For example, the control circuitry 6 may park the head 4 on the disk 2 in a landing zone, or on a ramp at the outer periphery of the disk 2, to reduce the power consumption of the VCM 24. The control circuitry 6 may also control the spindle motor to spin down the disk 2 after parking the head 4 to further improve power consumption. In yet another embodiment, part of the control circuitry 6 (e.g., the host interface circuitry) may be powered down while the disk drive is in the idle mode. As described below with reference to FIG. 4, the computer device may have a number of different idle modes wherein each idle mode powers down one or more of the components.

In one embodiment, the command intervals may be measured from reception by the device of corresponding commands. In another embodiment, the command intervals may be measured from the responses sent by the device to the host relating to the corresponding commands. In still other embodiments, different stages in the process by which the device receives and responds to these commands may be used to start the command intervals.

The qualifying number of command intervals that fall within the sliding window may be any suitable number. In example embodiments described below, the qualifying number is the minimum number of the command intervals that fall within the sliding window, and in an alternative embodiment, the qualifying number is a predetermined percentage of the command intervals that fall within the sliding window.

In one embodiment, the control circuitry 6 slides the sliding window from a minimum value to a maximum value. These limits ensure the computer device will remain in the active mode for at least a minimum interval, as well as timeout and enter the idle mode after a maximum interval.

In another embodiment, the timeout interval for entering the idle mode is set relative to a break even interval corresponding to a minimum amount of time the device must remain in the idle mode in order to reduce power consumption. That is, the timeout interval may be set so that after entering the idle mode, the probability that the next command will be received within the break even interval is minimized. Therefore, in one embodiment the width of the sliding window is set to the break even interval, and the sliding window is effectively "slid" over a command interval distribution to find the minimum number of command intervals that fall within the sliding window. The timeout interval is then set to the beginning of the sliding window, thereby minimizing the probability that after entering the idle mode the next command will be received within the break even interval.

Optimal power savings is achieved as long as the width of the sliding window exactly matches the actual break even interval for each individual device. If the width of the window exceeds the actual break even interval, the timeout interval may be set longer than needed, resulting in lost power by preventing the device from entering the idle mode when it should. Conversely, if the width of the window is less than the actual break even interval, the timeout interval may be set too short resulting in lost power due to the device exiting the idle mode if the next command is received within the break even interval.

In one embodiment, a nominal break even interval is estimated for a family of devices by evaluating a subset of the devices. The width of the sliding window is then set to the nominal break even interval for each production device. In this manner, each device will operate with near optimal power savings, wherein the window width may be shorter than the actual break even interval for a number of devices, and longer than the actual break even interval for other devices. In one embodiment, a predetermined margin may be added to the nominal window width to ensure the width exceeds the break even interval for a majority of the production devices. In this manner, the device will exhibit better performance since the power loss will be due to a longer than necessary timeout interval rather than due to the device exiting the idle mode too soon.

If a predetermined margin is added to a nominal window width, each production device may take steps to operate less conservatively. For example, a production device may reduce the window width incrementally while monitoring the power consumption of the device over a predetermined interval (e.g., using suitable power measurement circuitry). The width of the window may be reduced until the power consumption within the predetermined interval begins to rise. In an alternative embodiment, the device may add a predetermined offset to the timeout interval relative to the beginning of the window. For example, in the embodiment wherein a margin is added to the nominal window width, the timeout interval may be increased by a predetermined offset to account for the margin added to the window width.

In an alternative embodiment, the break even interval is estimated for each device during a manufacturing procedure, or while in the field. For example, in one embodiment the device may comprise suitable circuitry for measuring the amount of power consumed by the device to exit the idle mode, as well as the amount of power consumed to remain active. These measurements can be used to derive a reasonable estimate of the actual break even interval, and therefore a more accurate estimate of the optimal window width. Suitable circuitry for measuring the power may include a voltage detector, a current detector, and an integrator for integrating the current over a predetermined interval. In one embodiment, the break even interval is re-estimated over the life of the device to account for changes in power consumption due, for example, to mechanical degradation. Such calibration is preferably performed at periodic intervals, or upon the happening of particular events.

Operation of the sliding window is better understood by considering a number of different possible command interval distributions. FIG. 2A shows a command interval distribution wherein the device is servicing commands at a higher frequency such that a majority of the command intervals occur near the beginning of the distribution. After sliding the window from the minimum value to the maximum value, the minimum number of command intervals that fall within the sliding window occurs at the upper end of the distribution resulting in the timeout interval being set to a maximum. Consequently, the device will enter the idle mode only if the current command interval exceeds the maximum timeout interval, thereby saving power by reducing the likelihood of entering/exiting the idle mode.

Figure 2B:
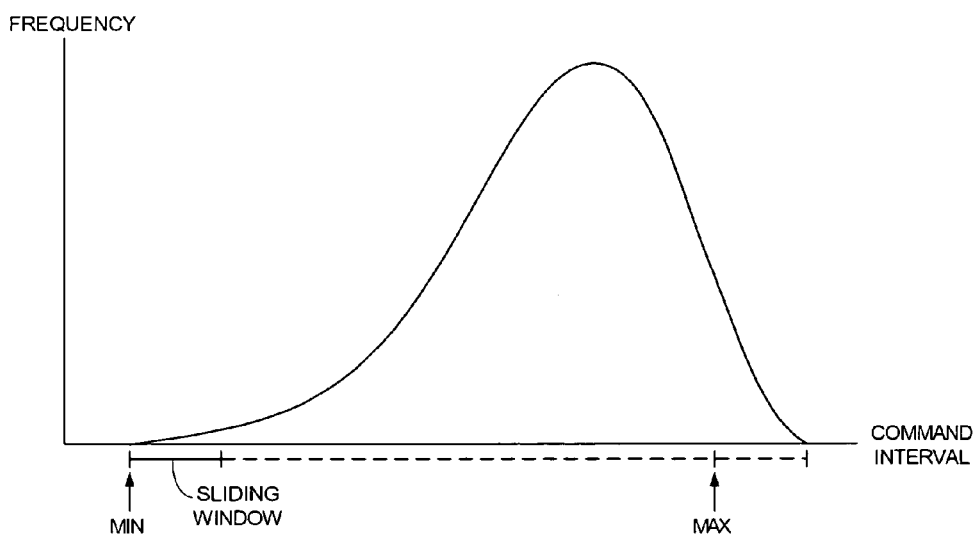
FIG. 2B shows a command interval distribution wherein the device is servicing commands at a low frequency such that the timeout interval is set to a minimum.

FIG. 2B shows a command interval distribution wherein the device is servicing commands at a low frequency such that a majority of the command intervals occur near the end of the distribution. After sliding the window from the minimum value to the maximum value, the minimum number of command intervals that fall within the sliding window occurs at the beginning of the distribution resulting in the timeout interval being set to a minimum. Consequently, the device will save power by entering the idle mode soon after processing the current command since there is a high probability that the next command will not be received until after the break even interval. In one embodiment, the device may enter the idle mode almost immediately after processing the current command.

Figure 3A:
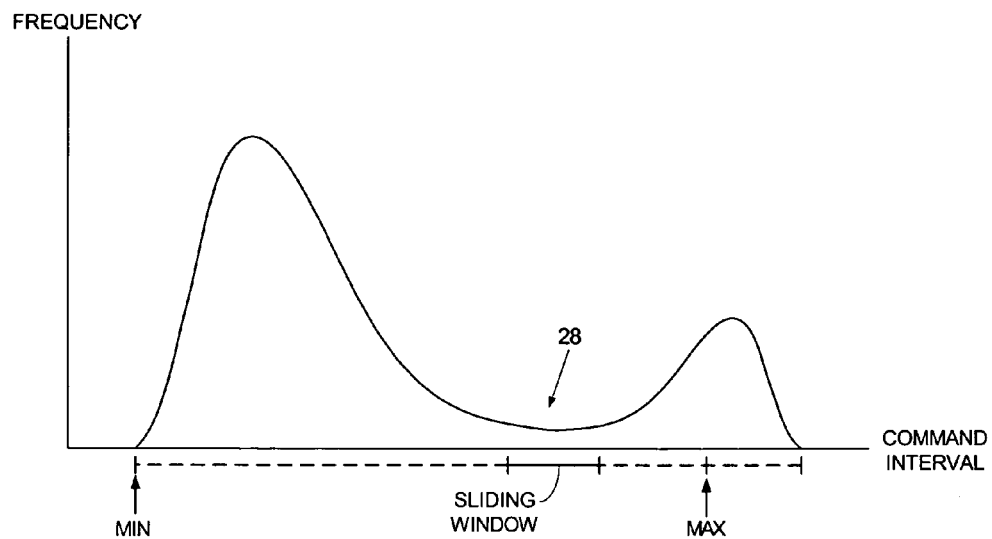
FIG. 3A shows a command interval distribution wherein the device is transitioning between a high frequency command mode to a low frequency command mode causing the timeout interval to decrease relative to FIG. 2A.

FIG. 3A shows a command interval distribution wherein the device is transitioning from the high frequency command mode of FIG. 2A to the low frequency command mode of FIG. 2B such that a "dip" 28 occurs in the distribution. After sliding the window from the minimum value to the maximum value, the minimum number of command intervals that fall within the sliding window occurs at the dip 28. The timeout interval is therefore reduced as compared to FIG. 2A. If the current command interval exceeds the timeout interval (the beginning of the sliding window), then the device enters the idle mode since there is a high probability that the next command will not be received until after the break even interval, as illustrated in FIG. 3A. That is, after the current command interval reaches the timeout interval, there is a high probability that the device will remain idle longer than the break even interval, therefore it is more likely that power will be saved by entering the idle mode.

Figure 3B:
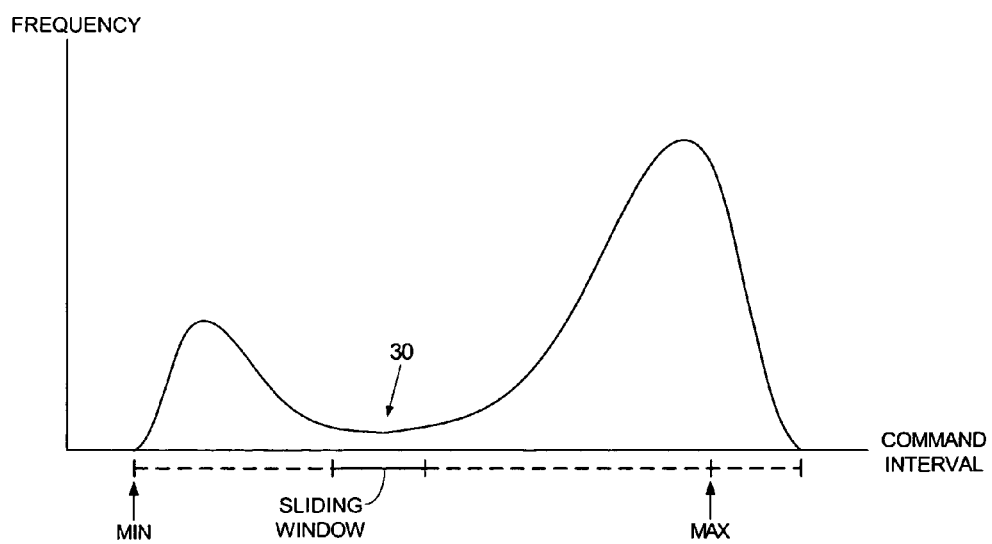
FIG. 3B shows a command interval distribution wherein the device is transitioning between a low frequency command mode to a high frequency command mode causing the timeout interval to increase relative to FIG. 2B.

FIG. 3B shows a command interval distribution wherein the device is transitioning from the low frequency command mode of FIG. 2B to the high frequency command mode of FIG. 2A such that a dip 30 occurs in the distribution. After sliding the window from the minimum value to the maximum value, the minimum number of command intervals that fall within the sliding window occurs at the dip 30. The timeout interval is therefore increased as compared to FIG. 2B, since to save power the device should remain active for a longer period if the frequency of commands is increasing.

The minimum and maximum values bounding the range of possible timeout intervals may be set according to any desirable operating condition. In one embodiment, the minimum and maximum values are selected to account for outliers. As described below with reference to FIG. 6, in another embodiment the minimum and maximum values are set to achieve a desired power/performance operating mode. In yet another embodiment, the minimum and maximum values are set relative to a current idle mode out of a number of different possible idle modes. The device may, for example, park the head 4 and power down the VCM 24 as a first level of power management, and then power down the spindle motor as a second level of power management. In this embodiment, at least one of the window width, minimum value, and maximum value is adjusted relative to the level of power management (idle mode) as understood from the flow diagram of FIG. 4 which is an extension of the flow diagram of FIG. 1B.

Figure 5A:
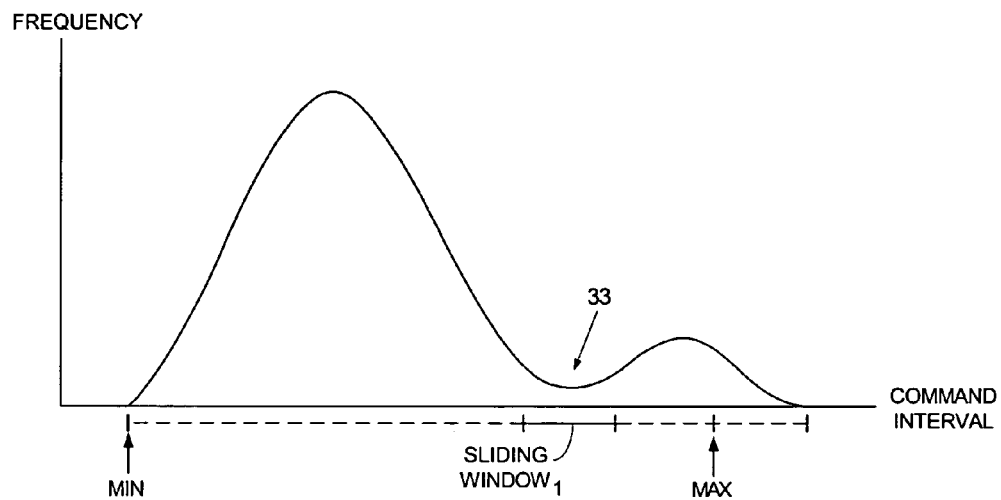
FIGS. 5A-5C illustrate how the window width may be changed relative to a current idle mode or relative to a desired power/performance operating mode.
Figure 5B:
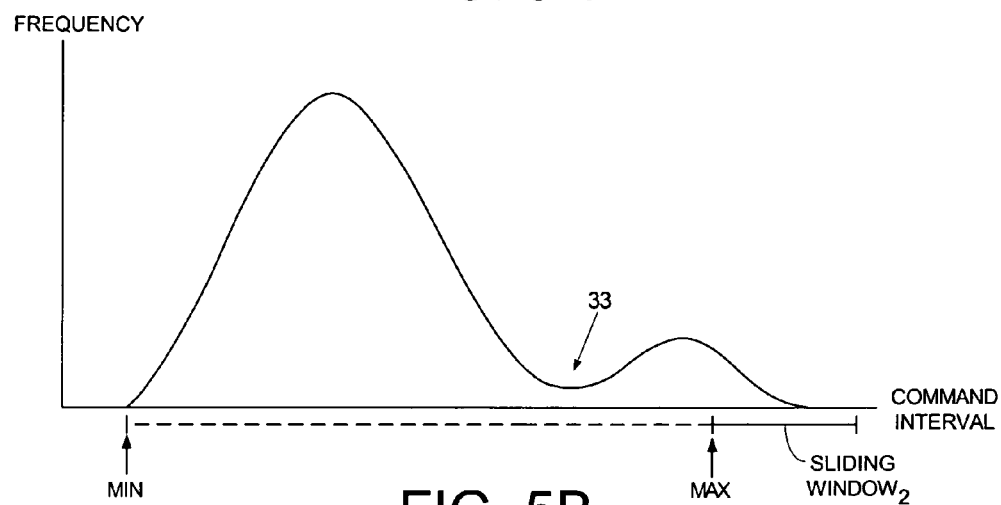
Figure 5C:
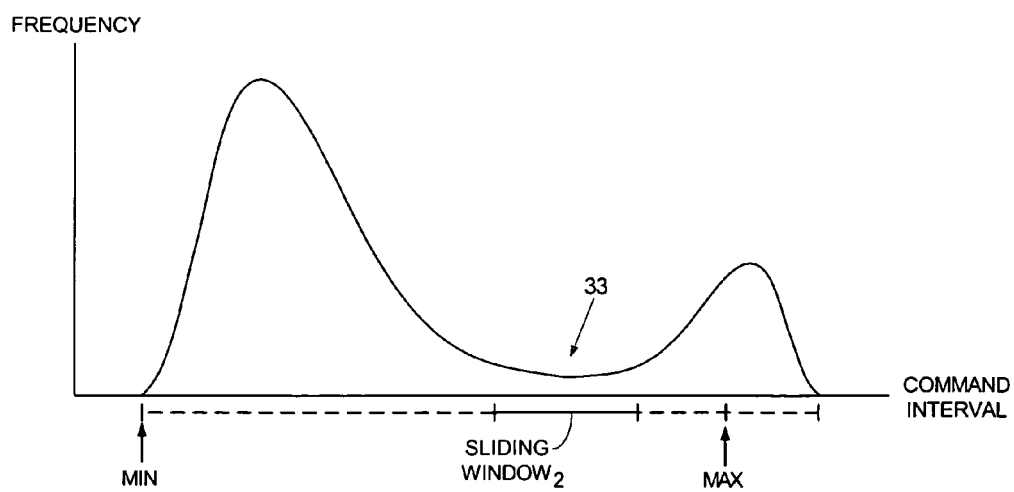

If at step 20 the current command interval exceeds the timeout interval, then at step 32 the device enters the first idle mode, for example, by parking the head 4 and powering down the VCM 24. At step 34 at least one of the window width, minimum value, and maximum value is adjusted corresponding to the new idle mode. For example, the window width may be increased so that the device does not enter the next idle mode until there is a sufficient dip in the command interval distribution (or until the current command interval exceeds the maximum value). This is understood with reference to FIGS. 5A-5C wherein in FIG. 5A a first sliding window is initialized to a first width corresponding to the active mode. There is a big enough dip 33 in the distribution of FIG. 5A such that the first sliding window moves toward the left of the distribution causing the device to enter the first idle mode within a shorter command interval. Once the device enters the first idle mode (e.g., parking the head 4), the window width is increased as illustrated in FIG. 5B to generate a second sliding window. However, in FIG. 5B the dip 33 in the distribution is not big enough to move the second sliding window to the left, and therefore the device will not enter the second idle mode until the current command interval exceeds the maximum value. FIG. 5C shows that when the distribution changes such that the dip 33 becomes big enough to move the second sliding window to the left, the device enters the second idle mode within a shorter command interval (e.g., spinning down the disk 2). A similar result can be achieved by adjusting the minimum or maximum values at the ends of the distribution, or a combination of the minimum and maximum values and the window width. Referring again to FIG. 4, when a new host command is received at step 22, at step 36 the minimum and maximum values and the window width are reset to correspond to the active mode.

Figure 6:
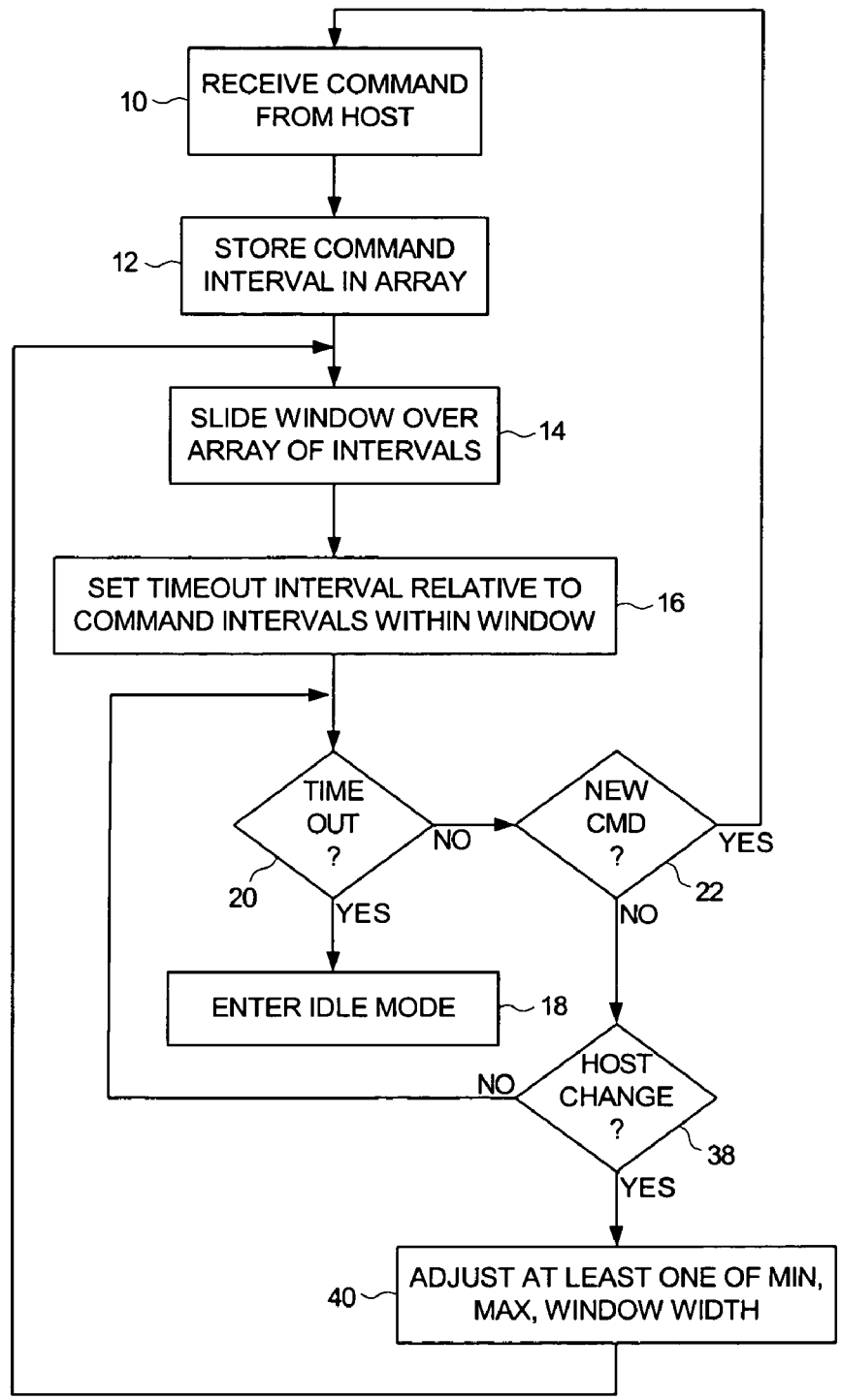
FIG. 6 is a flow diagram according to an embodiment of the present invention wherein at least one of the window width, minimum and maximum sliding window values is adjusted in response to a host command to configure the device into a desired power/performance operating mode.

FIG. 6 is a flow diagram according to an embodiment of the present invention wherein at least one of the minimum and maximum values and/or the window width are adjusted in response to a host command to configure the device into a desired power/performance operating mode. The flow diagram of FIG. 6 is an extension of the flow diagram of FIG. 1B wherein if at step 38 the device receives a host command to change the power/performance operating mode, at step 40 at least one of the minimum and maximum values at the ends of the distribution, and/or the window width is adjusted. For example, if the host 8 commands the device to operate with better performance (and consume more power), the control circuitry 6 may increase the window width so that the sliding window remains at the upper end of the distribution until there is a big enough dip to move the sliding window to the left. This keeps the device in the active mode longer, which improve performance. However, once the command intervals shift toward the upper end of the distribution, meaning that the frequency of commands has decreased, the sliding window shifts left so that the device enters the idle mode sooner to conserve power. Conversely, if the host 8 commands the device to operate with better power savings (and less performance), the control circuitry 6 may decrease the window width so that the sliding window shifts left sooner (at smaller dips in the distribution), thereby forcing the device into the idle mode within a shorter command interval to save power. Note that the control circuitry 6 preferably limits the reduction in window width to the break even interval, otherwise the device will actually consume more power by entering/exiting the idle mode as described above.

In another embodiment, the control circuitry 6 may identify two or more dips in the command interval distribution. Since performance will typically improve with the window ending up further right toward the end of the distribution, in one embodiment the control circuitry 6 selects a dip near the right of the distribution over a dip near the left of the distribution. In other words, if there is a global minimum near the left of the distribution, and a local minimum near the right of the distribution, the control circuitry 6 may select the local minimum near the right of the distribution to achieve better performance. In one embodiment, the control circuitry 6 compares the magnitude of the dips (difference in the number of commands that fall within the sliding window at each dip). If the difference between the dips falls below a threshold, then the control circuitry selects the dip furthest to the right of the distribution to achieve better performance, since the difference in power consumption should be negligible.

In yet another embodiment, the control circuitry 6 may find a dip in the command interval distribution that satisfies a predetermined condition. For example, in one embodiment the control circuitry 6 may start the sliding window at the end of the distribution (furthest right for best performance) and then slide the window left until a predetermined percentage of the command intervals fall within the sliding window. In this embodiment, the sliding window may stop at a local minimum before reaching the global minimum within the distribution. However, as long as the predetermined percentage is selected reasonably small, any additional power loss should be negligible while improving performance.

Figure 7A:
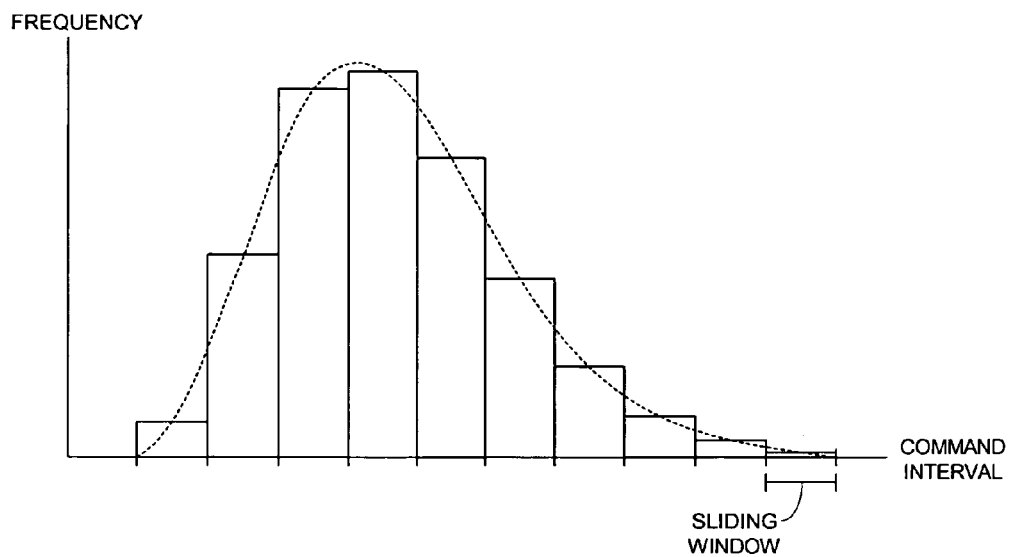
FIG. 7A shows an embodiment for implementing the present invention using a histogram comprising a plurality of buckets, wherein a width of the sliding window equals the width of one of the buckets.

The power management algorithm for adjusting the timeout interval by sliding the window over the command interval distribution may be implemented using any suitable technique. In one embodiment, the power management algorithm is implemented using a histogram comprising a plurality of buckets, wherein a width of each bucket equals a quantized step in the command interval, and each bucket stores a value representing the number commands having a corresponding command interval. In one embodiment, a width of the sliding window equals the width of one of the buckets, and the control circuitry 6 sets the timeout interval by finding the minimum bucket value. This is illustrated in FIG. 7A wherein there are ten quantized command intervals in the distribution, and therefore the histogram comprises ten buckets. Sliding the window over the command interval distribution in this embodiment simply means assigning the window to each bucket, and finding the bucket storing the minimum value.

Figure 7B:
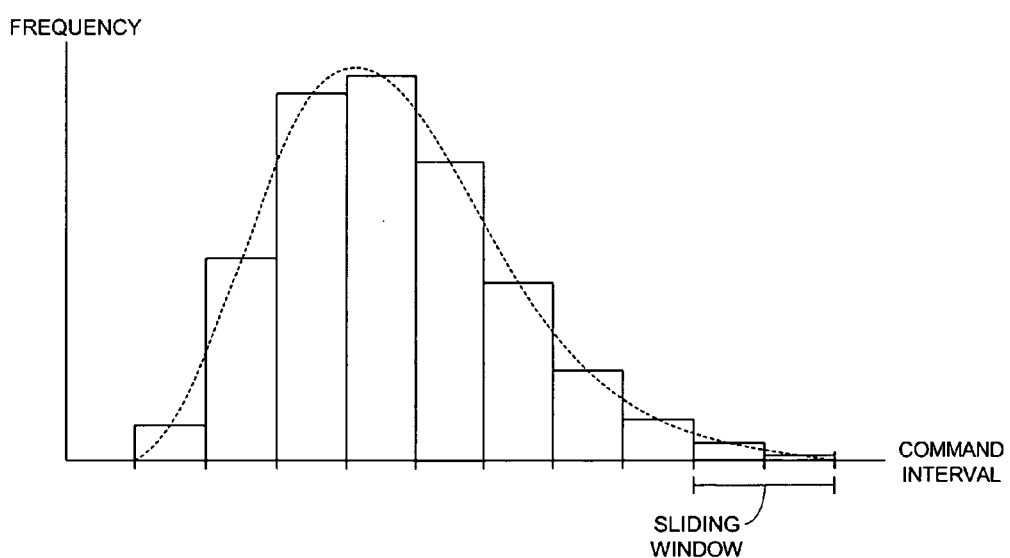
FIG. 7B shows an embodiment for implementing the present invention using a histogram comprising a plurality of buckets, wherein a width of the sliding window equals the width of a plurality of the buckets.

In an alternative embodiment the width of the sliding window equals the width of a plurality of buckets, and the control circuitry 6 sets the timeout interval by finding the minimum of the plurality of combined bucket values. This is illustrated in FIG. 7B wherein in this example the width of the sliding window is set to the width of two buckets. The control circuitry 6 then slides the window over the command interval distribution by incrementing the sliding window one bucket width at a time, and then finding the minimum of the combined two bucket values.

We claim:

1. A computer device comprising:
    (a) at least one component operable to process commands received from a host at command intervals; and
    (b) control circuitry operable to:
        store a plurality of the command intervals;
        evaluate the plurality of command intervals to set a timeout interval by finding a qualifying number of the command intervals that fall within a sliding window; and
        configure the component into an idle mode if a most recent command interval exceeds the timeout interval.

2. The computer device as recited in claim 1, wherein the qualifying number is a minimum number of the command intervals that fall within the sliding window.

3. The computer device as recited in claim 1, wherein the qualifying number is a predetermined percentage of the command intervals that fall within the sliding window.

4. The computer device as recited in claim 1, wherein the computer device comprises a disk drive.

5. The computer device as recited in claim 1, wherein the most recent command interval is measured from reception by the computer device of a most recent command.

6. The computer device as recited in claim 1, wherein the most recent command interval is measured from a response sent by the computer device relating to a most recent command.

7. The computer device as recited in claim 1, wherein the control circuitry is further operable to slide the sliding window from a minimum value to a maximum value.

8. The computer device as recited in claim 1, wherein a width of the sliding window is substantially equal to a break even interval corresponding to a minimum amount of time the computer device must remain in the idle mode in order to reduce power consumption.

9. The computer device as recited in claim 1, wherein the control circuitry is further operable to set the timeout interval relative to a beginning of the sliding window.

10. The computer device as recited in claim 1, wherein:
    (a) the computer device is configured to enter a plurality of idle modes; and
    (b) the control circuitry is further operable to adjust a width of the sliding window relative to a current idle mode.

11. The computer device as recited in claim 7, wherein:
    (a) the computer device is configured to enter a plurality of idle modes; and
    (b) the control circuitry is further operable to adjust at least one of the minimum value and the maximum value relative to a current idle mode.

12. The computer device as recited in claim 1, wherein the control circuitry is further operable to adjust a width of the sliding window in response to a host command.

13. The computer device as recited in claim 7, wherein the control circuitry is further operable to adjust at least one of the minimum value and the maximum value in response to a host command.

14. A method of setting a timeout interval for a computer device comprising at least one component operable to process commands received from a host at command intervals, the method comprising the steps of:
    storing a plurality of the command intervals;
    evaluating the plurality of command intervals to set a timeout interval by finding a qualifying number of the command intervals that fall within a sliding window; and
    configuring the component into an idle mode if a most recent command interval exceeds the timeout interval.

15. The method as recited in claim 14, wherein the qualifying number is a minimum number of the command intervals that fall within the sliding window.

16. The method as recited in claim 14, wherein the qualifying number is a predetermined percentage of the command intervals that fall within the sliding window.

17. The method as recited in claim 14, wherein the computer device comprises a disk drive.

18. The method as recited in claim 14, wherein the most recent command interval is measured from reception by the computer device of a most recent command.

19. The method as recited in claim 14, further comprising the step of sliding the sliding window from a minimum value to a maximum value.

20. The method as recited in claim 14, wherein a width of the sliding window is substantially equal to a break even interval corresponding to a minimum amount of time the computer device must remain in the idle mode in order to reduce power consumption.

21. The method as recited in claim 14, further comprising the step of setting the timeout interval relative to a beginning of the sliding window.

22. The method as recited in claim 14, wherein the computer device is operable to enter a plurality of idle modes, further comprising the step of adjusting a width of the sliding window relative to a current idle mode.

23. The method as recited in claim 19, wherein the computer device is operable to enter a plurality of idle modes, further comprising the step of adjusting at least one of the minimum value and the maximum value relative to a current idle mode.

24. The method as recited in claim 14, further comprising the step of adjusting a width of the sliding window in response to a host command.

25. The method as recited in claim 19, further comprising the step of
    adjusting at least one of the minimum value and the maximum value in response to a host command.

* * * * *